United States Patent Office 2,917,409
Patented Dec. 15, 1959

2,917,409

FLUORINE COMPOUNDS, PROCESS OF PREPARING SAID COMPOUNDS, AND PROCESS OF RENDERING TEXTILE OIL REPELLENT

Larry Q. Green, Brandywine Hundred, Del., assignor to E. I. du Pont de Nemours and Company, Wilmington, Del., a corporation of Delaware No Drawing. Application December 31, 1958
Serial No. 784,063

9 Claims. (Cl. 117—121)

This invention relates to novel fluorine compounds and more particularly to fluorine compounds which may be used as textile treating agents so as to impart effective oil-repellency to the textile material so treated.

When treating textiles with various agents, to obtain oil-repellency the textile is preferably treated (in the mill) from aqueous systems. To be practical, aqueous solution or dispersions must be developed which will permit uniform application of the agents to the textile. In this regard, difficulty is often encountered, not only in the preparation of the solution or dispersion itself, but also in subsequent textile treating operations where additives may have an adverse effect. Furthermore, such dispersions, because they must contain surfactants or dispersants often reduce the effectiveness of the textile treating agent as an oil repellent.

It is an object of the present invention to provide novel fluorine compounds and to provide a method for their preparation. A further object is to provide novel fluorine compounds which may be applied to textile materials from aqueous solutions or dispersions without the use of additional dispersing agents. A still further object is to provide novel fluorine compounds which impart oil-repellency to textile materials. A still further object is to provide a process for treating textile materials with these novel compounds. Other objects will appear hereinafter.

These and other objects of this invention are accomplished by the novel compounds of the structure

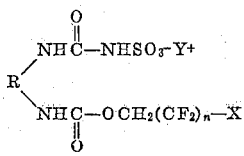

wherein R is a bivalent organic radical which is inert to isocyanate groups; X is hydrogen or halogen and Y+ is a positively charged ion which is either an alkali metal ion or a tertiary aliphatic amine ion and $n$ is an integer from 4 to 12. The novel compounds of this invention wherein Y+ is a tertiary aliphatic amine ion may be conveniently prepared by reacting, in a water-miscible organic solvent, one mole of an organic diisocyanate with essentially one mole of a fluoroalcohol and essentially one mole of a tertiary aliphatic amine salt of sulfamic acid. The resulting product may then be converted to the compound of the above general formula where Y+ is an alkali metal ion by reacting the same with an alkali metal salt. The novel compounds of this invention are highly useful as textile treating agents in that they may be used to pad a wide variety of textile materials, and after drying and curing steps, the resulting textile will be oil repellent.

The novel compounds of this invention may be prepared by several general procedures involving the reaction of an organic diisocyanate, a fluoroalcohol and a tertiary amine salt of sulfamic acid. These reactions are carried out in a water-miscible organic solvent such as dimethylformamide, dioxane or tetrahydrofuran. In one procedure the diisocyanate and fluoroalcohol are reacted first in the water-miscible solvent, which is preferably dimethylformamide, at room temperature and in the presence of a small amount of basic catalyst such as pyridine. This reaction is exothermic and is completed in a few minutes. It will be understood that essentially one mole of fluoroalcohol is used per mole of diisocyanate so that only one of the two isocyanate groups is reacted to form a mono-adduct. Then, the second step of the process is carried out and this is done by adding to the solution of the mono-adduct a solution of a tertiary aliphatic amine salt of sulfamic acid in the water-miscible solvent. An exothermic reaction again occurs and in a short time the reaction is complete.

In an alternate procedure the diisocyanate is first reacted with the amine salt of sulfamic acid and the mono-adduct thus obtained is then reacted with the fluoroalcohol. This process differs from that described above only in the order of addition. There is little difference between the two processes, but the former is preferred. It will be understood that if the diisocyanate is assymetric and contains isocyanate groups of different reactivity, position isomers of the product will be obtained with the different procedures.

In addition to the above procedures, the novel compounds may be prepared by reacting the alcohol, the sulfamic acid salt and the diisocyanate simultaneously. In this case a mixture of position isomers of the product will be obtained.

The organic diisocyanates useful for preparing the novel compounds of this invention are well known in the art. Any of a wide variety of organic diisocyanates may be used including aromatic, aliphatic and cycloaliphatic diisocyanates. Representative compounds include toluene-2,4-diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexylisocyanate), 1,5-tetrahydronaphthalene diisocyanate, and the like. The preferred diisocyanate is toluene-2,4-diisocyanate. In the structural formula defining the novel compounds of this invention, the letter R is used to designate the organic portion of the diisocyanate compound. R is defined as any bivalent organic radical. The limitation that R be inert to isocyanate groups is obvious since this R radical may not contain any substituent reactive with isocyanate groups.

The fluoroalcohols used for reaction with the diisocyanate have the structure $X(CF_2)_nCH_2OH$ where X is hydrogen or halogen and $n$ is an integer from 4 to 12. Where X is hydrogen, these fluoroalcohols are obtained by telomerization of tetrafluoroethylene and methanol. Where X is halogen, the fluoroalcohols are obtained by reduction of the corresponding acids with lithium aluminum hydride. Thus, examples of useful fluoroalcohols include 1,1,5-trihydroperfluoropentyl alcohol, 1,1-dihydroperfluorohexyl alcohol, 1,1-dihydroperfluorododecyl alcohol, 9-chloro-1,1-dihydroperfluorononyl alcohol, and the like.

The amine salt of sulfamic acid which is used to prepare the novel compounds is, as indicated, a tertiary aliphatic amine salt and the term aliphatic is meant to include cycloaliphatic. Thus the amine salts may be derived from trimethylamine, triethylamine, triisooctylamine, methylethylcyclohexylamine, diethylcyclohexylamine, etc.

When preparing the novel compounds of this invention the amounts of reactants used should be essentially stoichiometric. That is, for each mole of diisocyanate about one mole of fluoroalcohol and about one mole of the tertiary amine sulfamic acid salt will be used. However, it is preferred to use a slight excess of tertiary aliphatic amine when preparing its salt with sulfamic acid in order to keep the reaction medium slightly alkaline because acid conditions are conducive to side reactions and decomposition of the diisocyanate.

After the reaction is completed, the resulting product corresponds to a compound as defined in the general formula where $Y^+$ is a tertiary aliphatic amine group and these compounds may be obtained from solution by vacuum distillation of the solvent. To illustrate further, if the triethylamine salt of the sulfamic acid is used, the compound may be designated by the formula

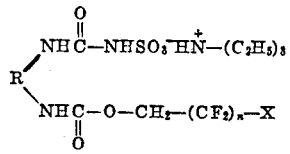

wherein X and N are as defined above.

The compounds of this invention wherein $Y^+$ is a tertiary aliphatic amine group may be used in solution to treat various textile materials or they may be readily converted to the alkali metal salts, i.e., wherein $Y^+$ is an alkali metal ion. This conversion may be easily carried out by adding the appropriate alkali metal salt, e.g. NaCl, KCl, NaNO₃, LiBr, etc. to the amine salt solution and filtering off the product which precipitates. The resulting alkali metal salts are white crystalline materials. The alkali metal salts have somewhat less solubility or dispersibility in water than the amine salts, but solution of these alkali metal salts is readily obtained in aqueous systems containing acetone, tetrahydrofuran, dioxane or other water-miscible common organic solvents. The amount of solvent used may vary from about 15% to 50% by weight depending on the particular alkali metal salt and the solvent.

The compounds of this invention have transient surface activity and for that reason they may be used to treat various textile materials without using additional surfactants or dispersants. This transient surface activity may be readily demonstrated by shaking or agitating a solution of the compound at which time copious foaming is observed. However, when these solutions are heated for several minutes at temperatures above about 70° C., hydrolysis occurs and on cooling an insoluble material precipitates.

The procedure to follow when using the novel compounds of this invention to impart oil repellant effects to textiles is simple and is in accord with the processes known to those familiar with the textile treating art. The solvent solution of the novel amine salt compositions, as obtained from the reaction, may be used directly. It is simply diluted with water to produce a solution or dispersion of the amine salt and the textile is treated in this aqueous system. When using an alkali metal salt it may be advantageous to use a small amount of water-miscible solvent, e.g. tetrahydrofuran, to enhance solubility of the salt in the water. The amount of material, i.e., amine or alkali metal salt, padded on the textile will vary somewhat, but it has been found that 1% to 5% of solids on the fabric produces excellent oil repellent effects. The amount of salt put on the fabric is controlled by means of the concentration of the pad bath and by adjusting the uptake. The treated fabrics are then air dried and cured for approximately 1 to 3 minutes at about 100° to 170° C. It is this curing procedure which causes the novel compositions to lose their hydrophilic character and become oil repellents. Textiles treated as just described are found to repel oil even after washing in automatic type washers for 15 minutes. Even after washing in the presence of detergents oil repellent effects are still retained.

Any of a wide variety of textile materials may be treated with the novel compounds of this invention including cotton, wool, nylon, etc.

The following examples will better illustrate the nature of the present invention; however, the invention is not intended to be limited to these examples. Parts are by weight unless otherwise indicated.

The test to evaluate oil repellency is based on the different penetrating properties of mineral oil and n-heptane. Mixtures of those two hydrocarbon liquids, which are miscible in all proportions, show penetrating properties proportional to the amount of n-heptane in the mixture.

To measure oil repellency of a treated fabric, 8" x 8" swatches of the fabric are placed on a table and a drop of the test mixture gently placed onto the fabric surface. After 3 minutes, the wetting and penetration of the fabric is visually observed. From the following table, the number corresponding to that mixture which contains the highest percentage of heptane which does not penetrate or wet the fabric is taken as the oil repellency rating.

| Oil Repellency Rating | Percent by Volume Heptane | Percent by Volume Mineral Oil |
| --- | --- | --- |
| 100 | 60 | 40 |
| 100 | 50 | 50 |
| 90 | 40 | 60 |
| 80 | 30 | 70 |
| 70 | 20 | 80 |
| 50 | 0 | 100 |
| 0 | | (¹) |

¹ No resistance to mineral oil (i.e. penetration within 3 minutes).

Usually, acceptable ratings are 70 and above, although beneficial effect to oil staining is sometimes obtained with ratings as low as 50.

Example 1

(A) A solution of 17.4 parts of 2,4-toluene diisocyanate and 43.2 parts of 1,1,9-trihydroperfluorononyl alcohol [H(CF₂)₈CH₂OH] was prepared at room temperature in 57 parts of dry dimethylformamide. Then 1.0 part of pyridine was added. An immediate rise in temperature of 8° C. was observed as the reaction proceeded to form the mono-adduct. In a separate container a solution of the triethylamine salt of sulfamic acid was prepared by mixing 12.6 parts of sulfamic acid, 14.4 parts of triethylamine and 29 parts of dimethylformamide. This salt solution was then added to the mono-adduct solution and an exothermic reaction again occurred giving a temperature rise to 37° C. The mixture was heated slightly and held at 40° C. for about one hour to complete the reaction and in this way a solution of the product in dimethylformamide was obtained. The product corresponds to the structural formula:

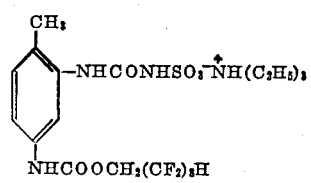

(B) The solution prepared in A above was diluted with water to obtain a 3% by weight solution of the product. Then fabrics of cotton and nylon were each padded with the milky dispersion to 100% wet pick-up and the fabrics air dried and then cured at 107° C. for 1.5 minutes. The treated fabrics were oil repellent (cotton 70 to 80; nylon 50) and retained this repellency after washing with detergent in an automatic washing machine.

Example 2

10 parts of a saturated aqueous potassium chloride solution was added to 30 parts of a dimethylformamide solution containing 20 parts of the triethylamine salt prepared in Example 1A. After mixing and standing in an ice bath for several minutes, the white precipitate was filtered off and washed with a cold saturated solution of potassium chloride. After drying, 14 parts of fine white powder were obtained.

This potassium salt was dissolved in an 80/20 mixture of water and tetrahydrofuran and foamed copiously on shaking. After heating to 90° C. for a few minutes, however, a white precipitate was observed to form on cooling.

When the potassium salt was used to treat cotton and wool textile fabrics as described in Example 1, an oil repellent finish durable to washing was obtained on the textile (cotton 80 to 70; wool 80 to 50).

*Example 3*

Example 1A was repeated except that 42.5 parts of 1,1,11-trihydroperfluoroundecyl alcohol was used as the fluoroalcohol. The product gave a good dispersion on dilution with water and effectively imparted an oil repellency rating to cotton fabric of from 80 to 90.

*Example 4*

In lieu of $H(CF_2)_8CH_2OH$ in Example 1A, 33 parts of $H(CF_2)_6CH_2OH$ was used. The product dispersed readily when the dimethylformamide solution was diluted with water and effectively provided cotton fabric with an oil repellent finish having a repellency rating of 70.

*Example 5*

Following the details of Example 1A, 10.2 parts of 1,1-dihydroperfluorooctyl alcohol was used as the fluoroalcohol to produce a compound of structure

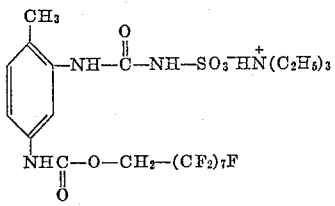

On evaluation as an oil repellent on wool, cotton and nylon according to the procedure of Example 1B, this compound gave ratings of 90 to 100.

*Example 6*

Following the details of Example 1A a reaction was carried out with 12.5 parts of methylene-bis(4-phenylisocyanate) and 21.6 parts of 1,1,9-trihydroperfluorononyl alcohol. This reaction product was then reacted with the triethylamine salt of sulfamic acid to yield a product of structure

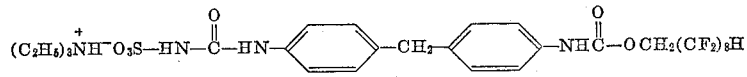

This product was evaluated on cotton according to Example 1B and found to impart oil repellency having a rating of 50 to 70, which was durable to washing.

*Example 7*

Example 1A was repeated using 8.41 parts of 1,6-hexamethylene diisocyanate and 26.6 parts of 1,1,11-trihydroperfluoroundecyl alcohol. The compound obtained corresponds to the structure

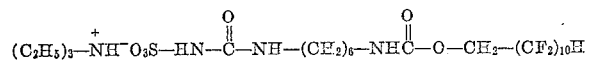

*Example 8*

A solution of a sulfamic acid salt was prepared by adding 9.7 parts of sulfamic acid and 12 parts of triethylamine to 14.3 parts of dimethylformamide and heating to 65° C. Then 17.4 parts of toluene-2,4-diisocyanate was dissolved in 47.5 parts of dimethylformamide and added to the amine sulfamate solution. A temperature rise from 60° C. to 92° C. was observed and the reaction mixture was held at 70° to 80° C. for 45 minutes at which time a clear, pink solution resulted. Then, a solution of 53.2 parts of 1,1,11-trihydroperfluoroundecyl alcohol in 47.5 parts of dimethylformamide was added to the pink solution of mono-adduct formed and the reaction mass held at 70° C. for 2 hours at which time a clear orange solution resulted.

On cooling, the product was dispersed in water and padded onto cotton, wool and nylon to give dry weight gains of 5.9%, 2.1% and 3.2% respectively. The dried fabrics were then cured at 168° C. for 3 minutes, washed with soap at 70° C. for 15 minutes, dried and evaluated as oil repellents. The oil repellency ratings obtained were: cotton—70, wool—90, and nylon—70.

As many widely different embodiments of this invention may be made without departing from the spirit and scope thereof, it is to be understood that this invention is not limited to the specific embodiments thereof except as defined in the appended claims.

What is claimed is:

1. A compound of the structure

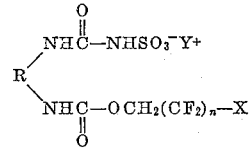

wherein R is a bivalent organic radical which is inert to isocyanate groups; X is selected from the group consisting of hydrogen and halogen, Y+ is a positively charged ion which is selected from the group consisting of an alkali metal ion and a tertiary aliphatic amine ion and n is an integer from 4 to 12.

2. A compound according to claim 1 wherein Y+ is

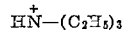

3. A compound according to claim 1 wherein Y+ is an alkali metal ion.

4. A compound according to claim 3 wherein the alkali metal ion is a potassium ion.

5. A compound according to claim 1 wherein n is 8 and X is hydrogen.

6. A compound according to claim 1 wherein n is 7 and X is fluorine.

7. A compound according to claim 1 wherein R is a 2,4-tolylene radical.

8. A process for preparing a fluorine compound which comprises reacting in a water-miscible organic solvent (a) one mole of an organic diisocyanate of the formula OCN—R—NCO wherein R is a bivalent organic radical which is inert to isocyanate groups with (b) essentially one mole of fluoroalcohol of the formula $$HOCH_2(CF_2)_n—X$$

wherein X is selected from the group consisting of hydrogen and halogen and n is an integer from 4 to 12 and with (c) essentially one mole of a tertiary aliphatic amine salt of sulfamic acid.

9. The process of preparing a textile material having oil repellent properties which comprises padding the textile material in an aqueous bath, said bath containing a compound having the structure

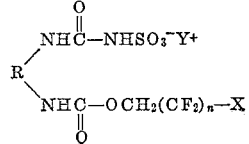

wherein R is a bivalent organic radical which is inert to isocyanate groups; X is selected from the group consisting of hydrogen and halogen, $Y^+$ is a positively charged ion which is selected from the group consisting of an alkali metal ion and a tertiary aliphatic amine ion and $n$ is an integer from 4 to 12, so as to deposit said compound on the material in an amount of from about 1% to 5% by weight of the dry textile material followed by drying and curing said treated textile material at a temperature between about 100° to 150° C.

No references cited.